US012478870B2

(12) United States Patent
Sakaino et al.

(10) Patent No.: US 12,478,870 B2
(45) Date of Patent: Nov. 25, 2025

(54) NON-TRANSITORY COMPUTER-READABLE STORAGE MEDIUM WITH EXECUTABLE INFORMATION PROCESSING PROGRAM STORED THEREON, GAME SYSTEM, GAME DEVICE, AND INFORMATION PROCESSING METHOD

(71) Applicant: NINTENDO CO., LTD., Kyoto (JP)

(72) Inventors: Masamichi Sakaino, Kyoto (JP); Naoya Morimura, Kyoto (JP); Satoshi Kawamata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 356 days.

(21) Appl. No.: 18/209,575

(22) Filed: Jun. 14, 2023

(65) Prior Publication Data

US 2024/0149157 A1 May 9, 2024

(30) Foreign Application Priority Data

Nov. 9, 2022 (JP) ................................. 2022-179455

(51) Int. Cl.
*A63F 13/49* (2014.01)
*A63F 13/48* (2014.01)
*A63F 13/533* (2014.01)

(52) U.S. Cl.
CPC .............. *A63F 13/49* (2014.09); *A63F 13/48* (2014.09); *A63F 13/533* (2014.09)

(58) Field of Classification Search
CPC ......... A63F 13/49; A63F 13/48; A63F 13/533
See application file for complete search history.

(56) References Cited

U.S. PATENT DOCUMENTS 9,474,971 B2 * 10/2016 Hayashida .............. A63F 13/48
2013/0198334 A1 * 8/2013 Ikenaga .................. A63F 13/10 709/217
2019/0030427 A1 * 1/2019 Lin ....................... A63F 13/843

FOREIGN PATENT DOCUMENTS

JP 2003071137 A 3/2003

* cited by examiner

*Primary Examiner* — Reginald A Renwick
(74) *Attorney, Agent, or Firm* — Scully, Scott, Murphy & Presser, P.C.

(57) ABSTRACT

When another information processing apparatus issues a request for participation of another player in multi-person play based on communication, a processor of a game device allows a state that another player has not participated in multi-person play to continue while a game program is being executed and it allows participation of another player in multi-person play when transition to a scene where execution of the game program with an emulator is started is made. The processor of the game device proceeds with multi-person play of the game program with the emulator based on communication between information processing apparatuses of players who participate in multi-person play, and temporarily suspends a game when an instruction to quit the game is given during multi-person play or when a request to quit the game is given from another player based on communication during multi-person play.

20 Claims, 12 Drawing Sheets

NON-TRANSITORY COMPUTER-READABLE STORAGE MEDIUM WITH EXECUTABLE INFORMATION PROCESSING PROGRAM STORED THEREON, GAME SYSTEM, GAME DEVICE, AND INFORMATION PROCESSING METHOD

This non-provisional application is based on Japanese Patent Application No. 2022-179455 filed on Nov. 9, 2022 with the Japan Patent Office, the entire contents of which are hereby incorporated by reference.

FIELD

The present disclosure relates to an information processing program, a game system, a game device, and an information processing method.

BACKGROUND AND SUMMARY

In implementing multi-person play in a conventional portable game console, a method of connecting portable game consoles to each other through a physical communication cable has been adopted in some cases. In such a communication game system, an operation to physically connect game consoles through a communication cable is substantially synonymous to participation of players in a game.

It is assumed that a game program executed in the conventional portable game console as described above is created on the premise that connection through a physical communication cable is established. Therefore, in an attempt to execute the game program with an emulator in a current device and to implement multi-person play over a network, an unexpected operation may occur. For example, participation/leave of a player that is common in a current game corresponds to insertion and removal of a communication cable from a point of view of the game program, and participation/leave of a player at any timing during a game may cause an unexpected operation such as forced termination depending on specifications of the game program. For example, if forced termination occurs in a game where saving is carried out, essential data that should be saved may not be saved.

The present disclosure provides a scheme to allow normal start and end of multi-person play in execution of a game program with an emulator to implement multi-person play through communication.

(Configuration 1) An exemplary embodiment provides an information processing program that causes a computer of an information processing apparatus to perform executing a game program adapted to multi-person play with an emulator, when another information processing apparatus issues a request for participation of another player in the multi-person play based on communication, allowing a state that the another player has not participated in the multi-person play to continue while the game program is being executed and allowing the another player to participate in the multi-person play when transition to a scene where execution of the game program with the emulator is started is made, proceeding with the multi-person play of the game program with the emulator based on communication between/among information processing apparatuses of players who participate in the multi-person play, and during the multi-person play, temporarily suspending a game when an instruction to quit the game is given or when a request to quit the game is given from another player based on communication and terminating the game program when an instruction to quit the game is given from information processing apparatuses of all players who participate in the multi-person play.

According to Configuration 1, even when a game program (in the past) for which connection to/disconnection from another information processing apparatus during progress of multi-person play has not been assumed is executed with the emulator, multi-person play can normally be started and terminated while the game program itself remains the same without being modified.

(Configuration 2) In Configuration 1, the game program adapted to the multi-person play may be at least one of a plurality of game programs adapted to multi-person play, and the scene where execution of the game program with the emulator is started may be a scene where selection as to which of the plurality of game programs is to be started is made.

According to Configuration 2, since execution of the emulator can be started in the scene where the game program to be played in multi-person play is selected, processing necessary for multi-person play can be performed in advance.

(Configuration 3) In Configuration 1 or 2, when the instruction to quit the game is given from the information processing apparatuses of all players who participate in the multi-person play and the game program is terminated, the information processing program may cause the computer to perform making transition to the scene where selection as to which of the plurality of game programs is to be started is made.

According to Configuration 3, even after multi-person play is terminated, when another multi-person play by the same players is desired again, the game program with which multi-person play is made can be selected by performing few operations.

(Configuration 4) In any of Configurations 1 to 3, when the instruction to quit the game is given from the information processing apparatuses of all players who participate in the multi-person play and the game program is terminated, the information processing program may cause the computer to perform making transition to the scene where selection as to which of the plurality of game programs is to be started is made, with a state that players have participated in the multi-person play being maintained.

According to Configuration 4, even after the game program with which multi-person play is made is terminated, the same players can immediately start multi-person play.

(Configuration 5) In any of Configurations 1 to 4, the information processing program may further cause the computer to perform, while the multi-person play is proceeding with the emulator, receiving a game screen of a player who has given an instruction for screen sharing to show the game screen and transmitting a game screen to another information processing apparatus when the computer receives an instruction for screen sharing.

According to Configuration 5, for example, even in execution with the emulator, of a game program for conventional portable game consoles on the premise that a game is played while a player views a game screen of another player or a game program for conventional portable game consoles that is more amusing when players play a game while they show their game screens to each other, the players can play the game as with the conventional portable game consoles.

Furthermore, according to Configuration 5, since each player can give an instruction for screen sharing, a play style that a player thinks suitable can freely be determined without the game program being modified.

(Configuration 6) Another exemplary embodiment provides a game system including a plurality of information processing apparatuses, each of the plurality of information processing apparatuses including a processor. The processor of each of the plurality of information processing apparatuses executes a game program adapted to multi-person play with an emulator, when another information processing apparatus issues a request for participation of another player in the multi-person play based on communication, allows a state that the another player has not participated in the multi-person play to continue while the game program is being executed and allows the another player to participate in the multi-person play when transition to a scene where execution of the game program with the emulator is started is made, proceeds with the multi-person play of the game program with the emulator based on communication between/among information processing apparatuses of players who participate in the multi-person play, and during the multi-person play, temporarily suspends a game when an instruction to quit the game is given or when a request to quit the game is given from another player based on communication and terminates the game program when an instruction to quit the game is given from information processing apparatuses of all players who participate in the multi-person play. According to Configuration 6, an effect similar to that in Configuration 1 is obtained.

(Configuration 7) In Configuration 6, the game program adapted to the multi-person play may be at least one of a plurality of game programs adapted to multi-person play, and the scene where execution of the game program with the emulator is started is a scene where selection as to which of the plurality of game programs is to be started is made. According to Configuration 7, an effect similar to that in Configuration 2 is obtained.

(Configuration 8) In Configuration 7, when the instruction to quit the game is given from the information processing apparatuses of all players who participate in the multi-person play and the game program is terminated, the processor may cause transition to the scene where selection as to which of the plurality of game programs is to be started is made. According to Configuration 8, an effect similar to that in Configuration 3 is obtained.

(Configuration 9) In Configuration 8, when the instruction to quit the game is given from the information processing apparatuses of all players who participate in the multi-person play and the game program is terminated, the processor may cause transition to the scene where selection as to which of the plurality of game programs is to be started is made, with a state that players have participated in the multi-person play being maintained. According to Configuration 9, an effect similar to that in Configuration 4 is obtained.

(Configuration 10) In any of Configurations 6 to 9, while the multi-person play is proceeding with the emulator, the processor may further receive a game screen of a player who has given an instruction for screen sharing to have the game screen shown, and transmit a game screen to another information processing apparatus when the processor receives an instruction for screen sharing. According to Configuration 10, an effect similar to that in Configuration 5 is obtained.

(Configuration 11) Another exemplary embodiment provides a game device including a processor. The processor of the game device executes a game program adapted to multi-person play with an emulator, when another information processing apparatus issues a request for participation of another player in the multi-person play based on communication, allows a state that the another player has not participated in the multi-person play to continue while the game program is being executed and allows the another player to participate in the multi-person play when transition to a scene where execution of the game program with the emulator is started is made, proceeds with the multi-person play of the game program with the emulator based on communication between/among information processing apparatuses of players who participate in the multi-person play, and during the multi-person play, temporarily suspends a game when an instruction to quit a game is given or when a request to quit the game is given from another player based on communication and terminates the game program when an instruction to quit the game is given from information processing apparatuses of all players who participate in the multi-person play. According to Configuration 11, an effect similar to that in Configuration 1 is obtained.

(Configuration 12) In Configuration 11, the game program adapted to the multi-person play may be at least one of a plurality of game programs adapted to multi-person play, and the scene where execution of the game program with the emulator is started may be a scene where selection as to which of the plurality of game programs is to be started is made. According to Configuration 12, an effect similar to that in Configuration 2 is obtained.

(Configuration 13) In Configuration 12, when the instruction to quit the game is given from the information processing apparatuses of all players who participate in the multi-person play and the game program is terminated, the processor may cause transition to the scene where selection as to which of the plurality of game programs is to be started is made. According to Configuration 13, an effect similar to that in Configuration 3 is obtained.

(Configuration 14) In Configuration 13, when the instruction to quit the game is given from the information processing apparatuses of all players who participate in the multi-person play and the game program is terminated, the processor may cause transition to the scene where selection as to which of the plurality of game programs is to be started is made, with a state that players have participated in the multi-person play being maintained. According to Configuration 14, an effect similar to that in Configuration 4 is obtained.

(Configuration 15) In any of Configurations 11 to 14, while the multi-person play is proceeding with the emulator, the processor may receive a game screen of a player who has given an instruction for screen sharing to have the game screen shown, and transmit a game screen to another information processing apparatus when the processor has received an instruction for screen sharing. According to Configuration 15, an effect similar to that in Configuration 5 is obtained.

(Configuration 16) Another exemplary embodiment provides an information processing method. In the method, a processor of a game device executes a game program adapted to multi-person play with an emulator, when another information processing apparatus issues a request for participation of another player in the multi-person play based on communication, the processor allows a state that the another player has not participated in the multi-person play to continue while the game program is being executed and allows the another player to participate in the multi-person play when transition to a scene where execution of the game program with the emulator is started is made, the processor proceeds with the multi-person play of the game program with the emulator based on communication between/among information processing apparatuses of players who participate in the multi-person play, and during the multi-person play, the processor temporarily suspends a game when an instruction to quit the game is given or when a request to quit the game is given from another player based on communication and terminates the game program when an instruction to quit the game is given from information processing apparatuses of all players who participate in the multi-person play. According to Configuration 16, an effect similar to that in Configuration 1 is obtained.

(Configuration 17) In Configuration 16, the game program adapted to the multi-person play may be at least one of a plurality of game programs adapted to multi-person play, and the scene where execution of the game program with the emulator is started may be a scene where at least one of the plurality of game programs is to be started is selected. According to Configuration 17, an effect similar to that in Configuration 2 is obtained.

(Configuration 18) In Configuration 17, when the instruction to quit the game is given from the information processing apparatuses of all players who participate in the multi-person play and the game program is terminated, the processor may cause transition to the scene where selection as to which of the plurality of game programs is to be started is made. According to Configuration 18, an effect similar to that in Configuration 3 is obtained.

(Configuration 19) In Configuration 18, when the instruction to quit the game is given from the information processing apparatuses of all players who participate in the multi-person play and the game program is terminated, the processor may cause transition to the scene where selection as to which of the plurality of game programs is to be started is made, with a state that players have participated in the multi-person play being maintained. According to Configuration 19, an effect similar to that in Configuration 4 is obtained.

(Configuration 20) In any of Configurations 16 to 19, while the multi-person play is proceeding with the emulator, the processor may receive a game screen of a player who has given an instruction for screen sharing to have the game screen shown, and transmit a game screen to another information processing apparatus when the processor has received an instruction for screen sharing. According to Configuration 20, an effect similar to that in Configuration 5 is obtained.

The foregoing and other objects, features, aspects and advantages of the present disclosure will become more apparent from the following detailed description of the present disclosure when taken in conjunction with the accompanying drawings.

DETAILED DESCRIPTION OF NON-LIMITING EXAMPLE EMBODIMENTS

Figure 1:
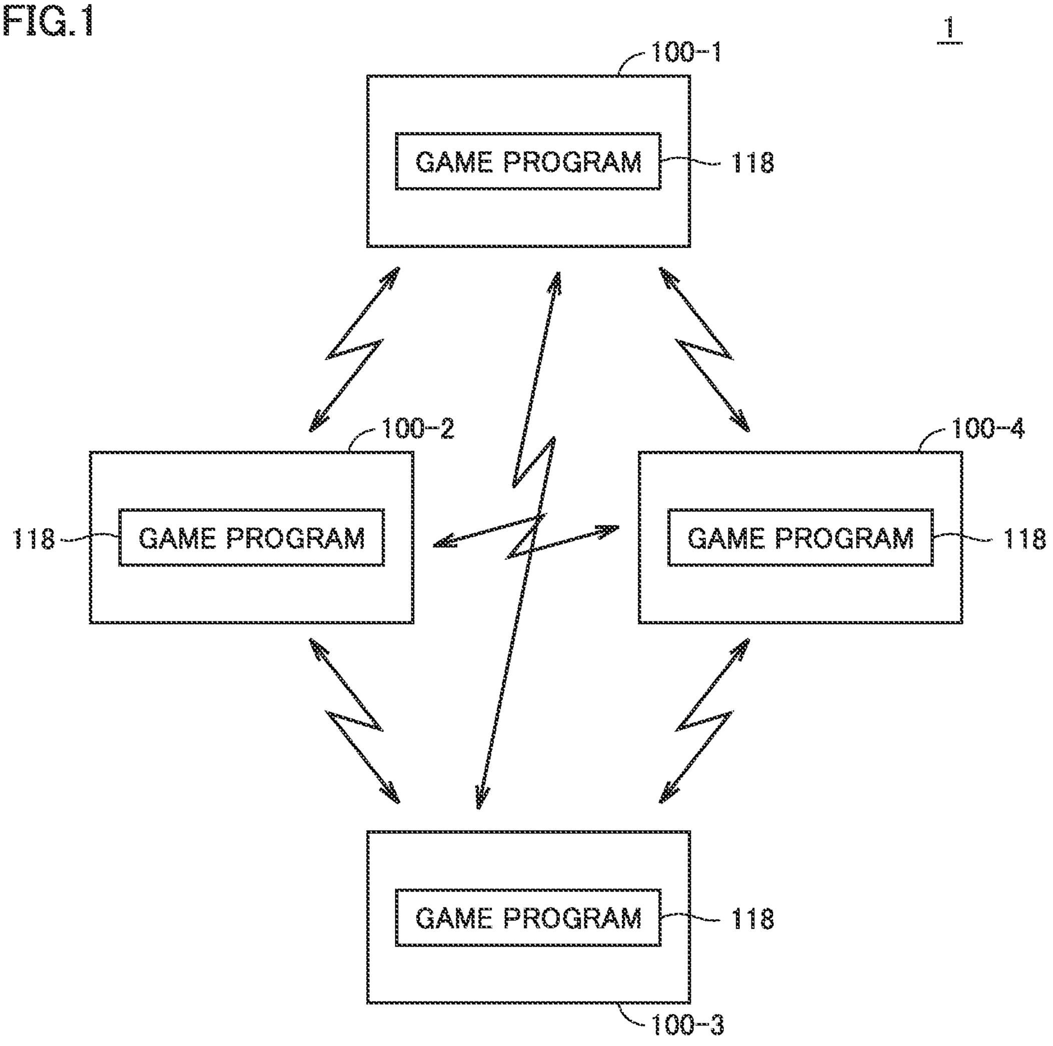
FIG. 1 shows an exemplary illustrative non-limiting drawing illustrating a configuration of a game system according to the present embodiment.

The present embodiment will be described in detail with reference to the drawings. The same or corresponding elements in the drawings have the same reference characters allotted and description thereof will not be repeated.

[A. Exemplary Configuration of Game System]

An exemplary configuration of a game system according to the present embodiment will initially be described.

The game system includes one or more information processing apparatuses. Any hardware configuration of the information processing apparatus may be applicable so long as the information processing apparatus can execute a game program with an emulator. The information processing apparatus may be implemented, for example, by a game device, a smartphone, a tablet, a portable telephone, or a personal computer. An exemplary configuration where a game device 100 representing a computer is adopted will be described below by way of example of the information processing apparatus.

FIG. 1 is a schematic diagram showing an exemplary configuration of a game system 1 according to the present embodiment. FIG. 1 shows an exemplary configuration in which four game devices 100-1 to 100-4 (which may also collectively be referred to as a "game device 100" below) are connected through local communication by way of example of a network.

Each of game devices 100 can communicate with one or more other game devices 100. So long as data can mutually be exchanged between/among game devices 100, any communication method (wired and wireless) may be adopted in game system 1 shown in FIG. 1. Game devices 100 may directly communicate with each other (for example, an ad hoc mode of wireless LAN) or communicate with a repeater being interposed (for example, an infrastructure mode of wireless LAN).

Figure 2:
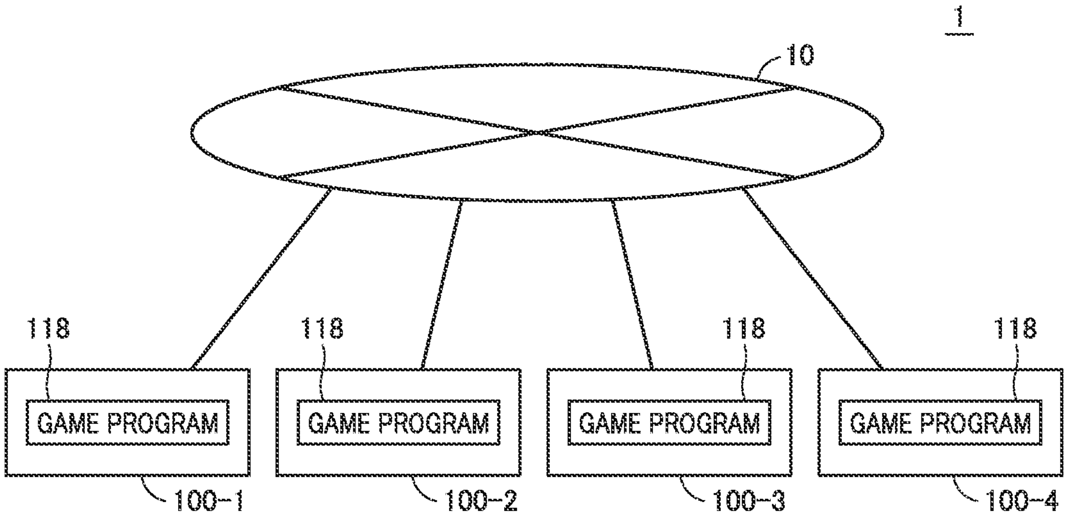
FIG. 2 shows an exemplary illustrative non-limiting drawing illustrating another configuration of the game system according to the present embodiment.

FIG. 2 is a schematic diagram showing another exemplary configuration of game system 1 according to the present embodiment. FIG. 2 shows an exemplary configuration in which four game devices 100-1 to 104 are connected through online connection over a network 10 by way of another example of the network. Game devices 100 mutually exchange data over network 10.

In game system 1 shown in FIG. 2, wired and wireless communication methods may be adopted as a communication method for connection of each of game devices 100 to network 10.

In each of FIGS. 1 and 2, each of game devices 100 can execute a game program 118 with an emulator. Game program 118 may be an application sold in the past.

In an example where game program 118 is adapted to multi-person play, each of game devices 100 proceeds with multi-person play of game program 118 with the emulator based on communication between/among game devices 100 of players who participate in multi-person play.

"Multi-person play" herein means simultaneous play of the same game program by a plurality of players (users). Alternatively, "multi-person play" means participation of a plurality of players (users) in the same player group. Further alternatively, "multi-person play" means execution of game program 118 in each of game devices 100 based not only on information on an operation by a player of that game device 100 but also on information from another game device 100.

All game devices 100 may hold in advance game program 118 with any method. When there is game device 100 that does not hold game program 118, that game device 100 may download game program 118 from game device 100 that holds game program 118. Alternatively, at least one game device 100 or all game devices 100 may download game program 118 as appropriate from a server (not shown) or the like.

[B. Exemplary Hardware Configuration]

An exemplary hardware configuration of game device 100 included in game system 1 according to the present embodiment will now be described.

Figure 3:
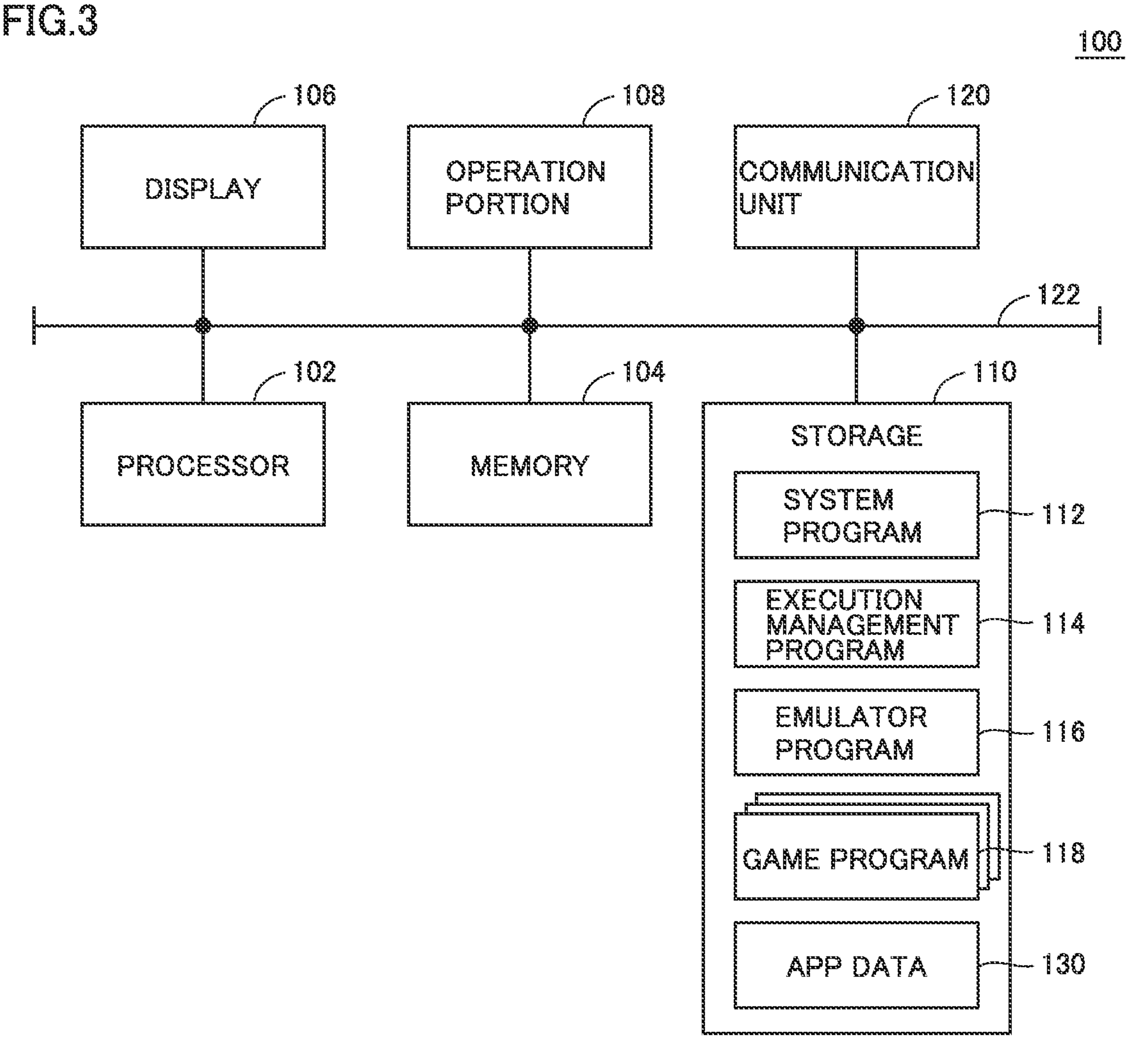
FIG. 3 shows an exemplary illustrative non-limiting drawing illustrating a hardware configuration of a game device according to the present embodiment.

FIG. 3 is a schematic diagram showing an exemplary hardware configuration of game device 100 according to the present embodiment. Referring to FIG. 3, game device 100 represents a computer by way of example, and includes one or more processors 102, a memory 104, a storage 110, a display 106, an operation portion 108, and a communication unit 120. These components are connected to communicate data with one another through a bus 122.

Processor 102 is a processing entity for performing processing provided by game device 100. Processor 102 executes a program stored in storage 110 by sequentially developing a necessary part thereof on memory 104.

Memory 104 is a volatile storage device (storage medium) that can be accessed by processor 102, and it may be implemented, for example, by a dynamic random access memory (DRAM) or a static random access memory (SRAM).

Storage 110 is a non-volatile storage device (storage medium) that can be accessed by processor 102, and it may be implemented, for example, by a hard disk or a solid state drive (SSD). Storage 110 may be, for example, a storage medium attachable to and removable from game device 100 such as an optical disc or a cartridge.

A system program 112, an execution management program 114, and an emulator program 116 are stored in storage 110.

System program 112 includes a computer-readable instruction for having processor 102 perform basic processing necessary for functioning as game device 100.

Execution management program 114 includes a computer-readable instruction for having processor 102 execute game program 118 with an emulator.

Emulator program 116 includes a computer-readable instruction for having processor 102 virtually set up an environment for execution of game program 118.

An "information processing program" according to the present embodiment includes at least execution management program 114. The "information processing program" may include system program 112 and/or emulator program 116. How a program is implemented is a matter of design and can be determined as appropriate in accordance with required performance and restrictions.

One or more game programs 118 may be stored in storage 110 or downloaded as appropriate from a server or the like in response to a request from a player. In this case, the game program does not have to be stored in storage 110, although it is developed on memory 104 only while it is executed.

By way of example, game program 118 is a program created to be executed in a game device (for example, a game device in the past developed prior to game device 100) different from game device 100. Even in execution of game program 118 by game device 100, it may remain original. In other words, game program 118 does not have to be modified for being executed with the emulator of game device 100.

App data 130 generated as a result of execution of game program 118 may be stored in storage 110.

Display 106 shows an image generated as a result of information processing by processor 102. A plurality of displays 106 may be provided. Game device 100 may be configured to use one or more external displays.

Operation portion 108 accepts an operation input from a player of game device 100. Operation portion 108 includes, for example, a push button, a control lever, a touch panel, a mouse, and/or the like. Operation portion 108 may be implemented by a game controller which is separate from game device 100 and connected through a wire or wirelessly.

Communication unit 120 communicates with another game device 100. Communication unit 120 may include hardware necessary for wired communication and/or hardware necessary for wireless communication. The entirety or a part of processing by communication unit 120 may be performed by processor 102.

Though FIG. 3 shows game device 100 as an integrated apparatus, the game device may be implemented as an assembly of a plurality of apparatuses. In other words, a single game device 100 may be implemented by combination of a plurality of independent apparatuses. For example, a separate configuration composed of a main body including hardware corresponding to processor 102, memory 104, and storage 110 and a display and operation portion including hardware corresponding to display 106 and operation portion 108 may be adopted.

At least a part of processing performed in game device 100 may be performed discretely by one or more other apparatuses arranged as being distributed over a network.

Processing performed in game device 100 may be implemented by execution of a program by processor 102, and a part or the entirety of the processing may be implemented by hard-wired circuitry such as an application specific integrated circuit (ASIC) or a field programmable gate array (FPGA). Therefore, the term "processor" herein encompasses not only an ordinary meaning of a processing circuit that performs processing in accordance with a computer-readable instruction described in a program, such as a central processing unit (CPU), a micro processing unit (MPU), or a graphics processing unit (GPU), but also hard-wired circuitry such as an ASIC or an FPGA. In the hard-wired circuitry such as an ASIC or an FPGA, circuitry corresponding to processing to be executed is formed in advance. Furthermore, the "processor" herein also encompasses circuitry in which a plurality of functions are integrated, such as a system on chip (SoC).

[C. Exemplary Functional Configuration]

An exemplary functional configuration of game device 100 included in game system 1 according to the present embodiment will now be described.

Figure 4:
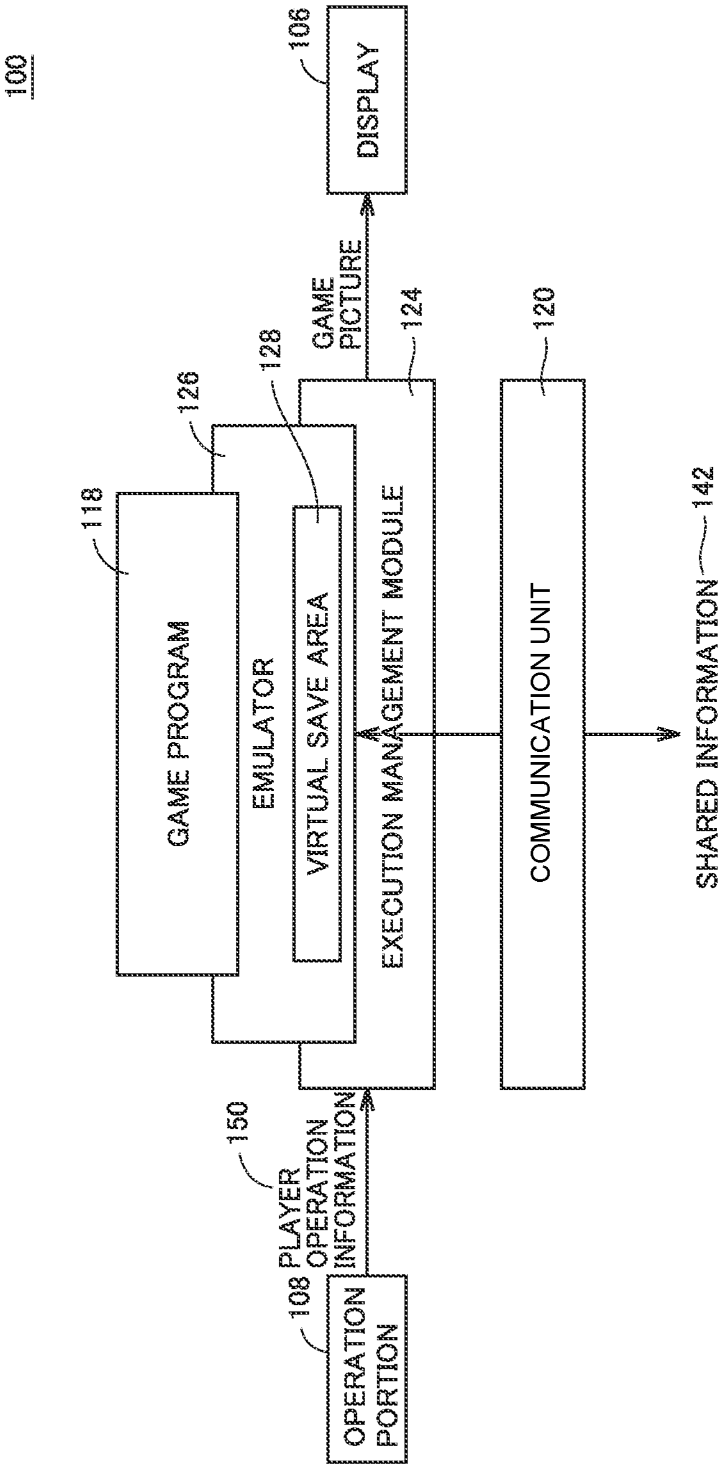
FIG. 4 shows an exemplary illustrative non-limiting drawing illustrating a functional configuration of the game device according to the present embodiment.

FIG. 4 is a schematic diagram showing an exemplary functional configuration of game device 100 according to the present embodiment. Referring to FIG. 4, game device 100 includes an execution management module 124 and an emulator 126 as its main functional configuration. Execution management module 124 is an instance generated by execution of execution management program 114 (FIG. 3) by processor 102 of game device 100, and emulator 126 is an instance generated by execution of emulator program 116 (FIG. 3) by processor 102 of game device 100. A plurality of emulators 126 may be generated in a single game device 100.

Execution management module 124 performs such processing as selection of game program 118 to be executed with emulator 126, management of execution of selected game program 118 with emulator 126, exchange of player operation information, and output of a game screen.

Execution management module 124 obtains contents of operations by a player (player operation information 150) onto operation portion 108 of the player's device and provides the contents to emulator 126. Execution management module 124 outputs a game screen obtained as a result of execution of game program 118 with emulator 126 to display 106. In addition, execution management module 124 may output from a speaker (not shown), voice and sound obtained as a result of execution of game program 118 with emulator 126.

Emulator 126 is a virtual environment for execution of game program 118, and it receives player operation information 150 and outputs a game screen and voice and sound as a result of execution. Emulator 126 exchanges shared data 142 with another emulator 126. Shared data 142 corresponds to data exchanged through a physical communication cable by a conventional portable game console. Shared data 142 is defined as data transmitted and received in multi-person play of game program 118. Shared data 142 includes information necessary for implementation of multi-person play and includes, for example, a coordinate of a character or an instruction for an action.

Emulator 126 includes a virtual save area 128 for game program 118 to have data saved. Virtual save area 128 behaves like an inherent save area from a point of view of game program 118. Though virtual save area 128 itself may be implemented on memory 104, saved data (app data) may be stored in storage 110 (for example, app data 130 in FIG. 3). Emulator 126 can be implemented based on a known technology.

In game system 1 according to the present embodiment, emulators 126 can establish connection that simulates a physical communication cable.

Figure 5:
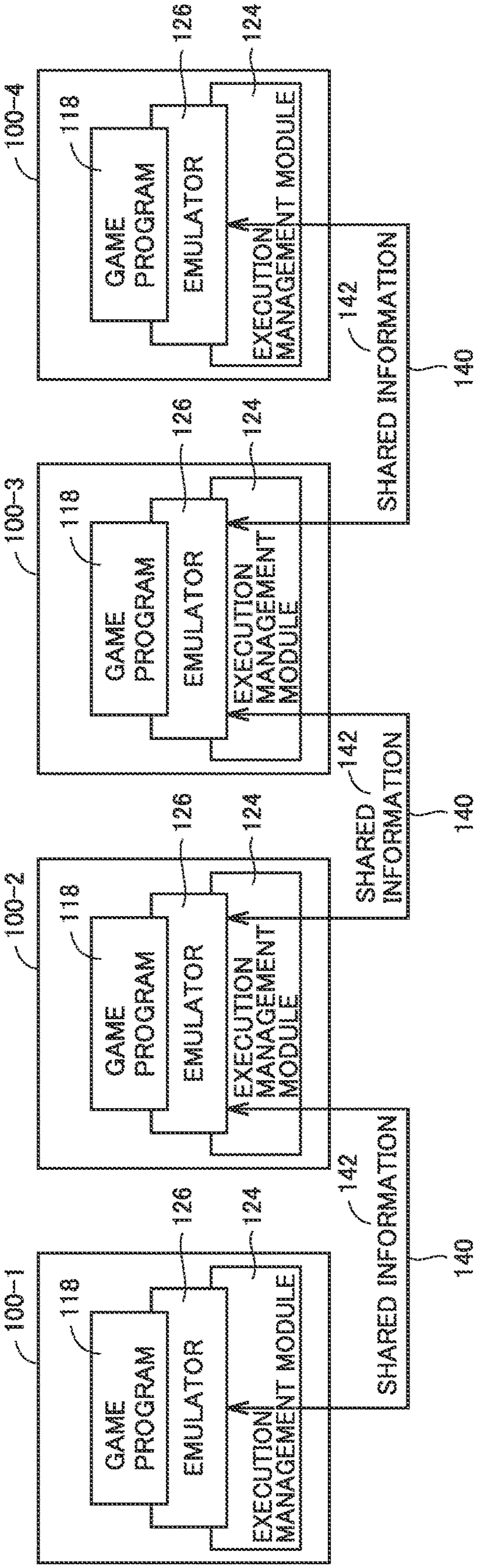
FIG. 5 shows an exemplary illustrative non-limiting drawing illustrating connection among game devices according to the present embodiment.

FIG. 5 is a schematic diagram for illustrating exemplary connection between/among game devices 100 according to the present embodiment. FIG. 5 shows an exemplary configuration in multi-person play of game program 118 by game devices 100-1 to 100-4, for example. Emulators 126 of game devices 100 establish connection 140 that simulates a communication cable by means of execution management modules 124. Connection 140 refers to a virtual or logical data transmission channel.

Emulator 126 exchanges with another emulator 126 through connection 140, shared data 142 that has been exchanged through a physical communication cable by a conventional portable game console. By establishing connection 140, from a point of view of game program 118, an environment similar to that of a plurality of portable game consoles connected through a physical communication cable can be provided.

Though FIG. 5 shows an example in which connection 140 is established between adjacent game devices 100 for the sake of convenience of illustration, connection 140 may be established between all pairs of emulators 126. Though FIG. 5 shows an exemplary configuration including four game devices 100, any number of game devices 100 may be provided.

[D. Exemplary Processing Procedure in Execution of Game Program]

An exemplary processing procedure in execution of game program 118 by game device 100 included in game system 1 according to the present embodiment will now be described.

In connection with game program 118 adapted to multi-person play, a plurality of players simultaneously participate. Therefore, for game device 100, by way of example, selection between two modes of a "host" that calls for participation in multi-person play and a "guest" that participates in response to a call from the "host" can be made.

Figure 6:
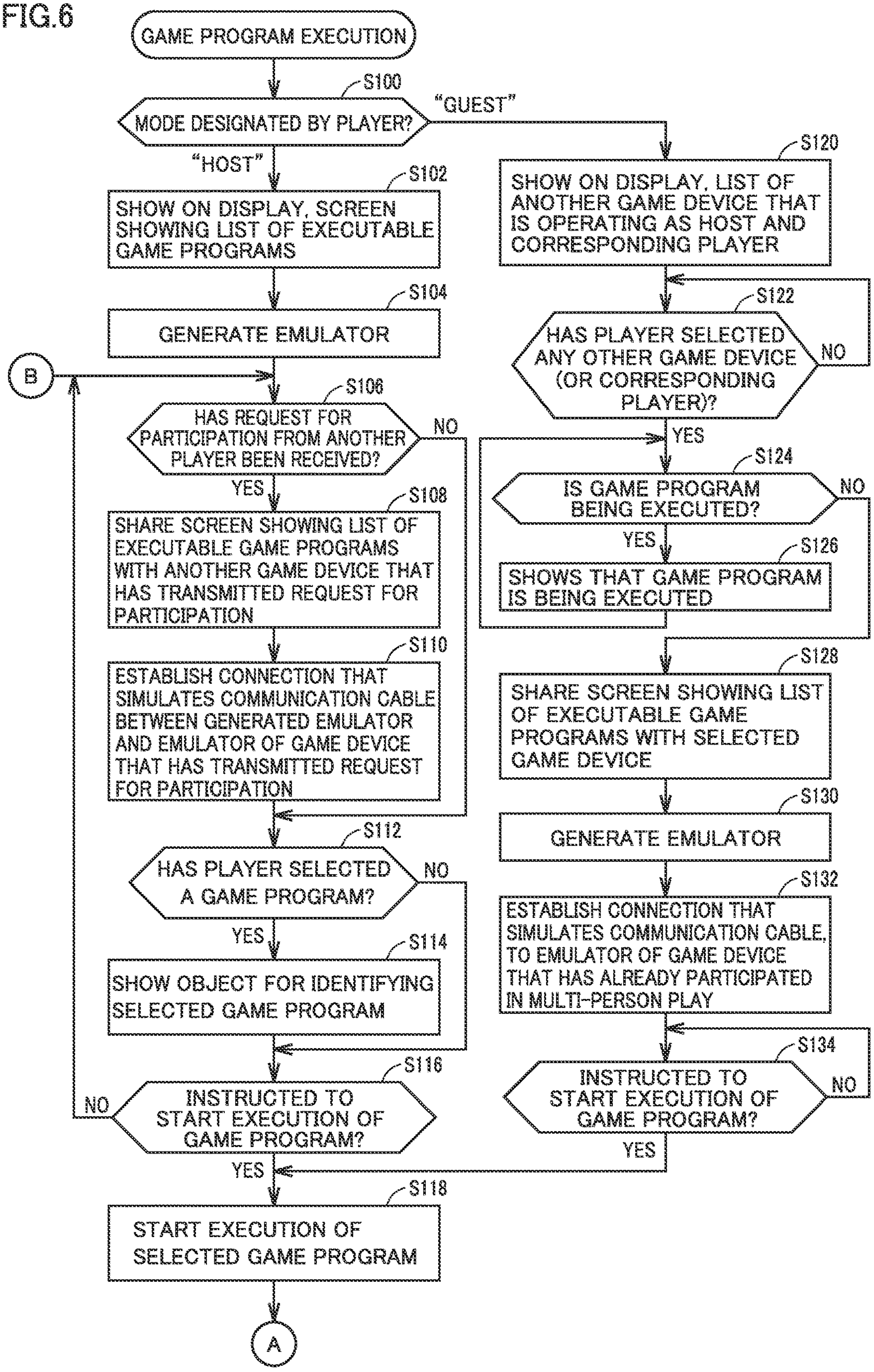
FIGS. 6 and 7 show exemplary illustrative non-limiting drawings illustrating an exemplary processing procedure when the game device included in the system according to the present embodiment executes a game program.
Figure 7:
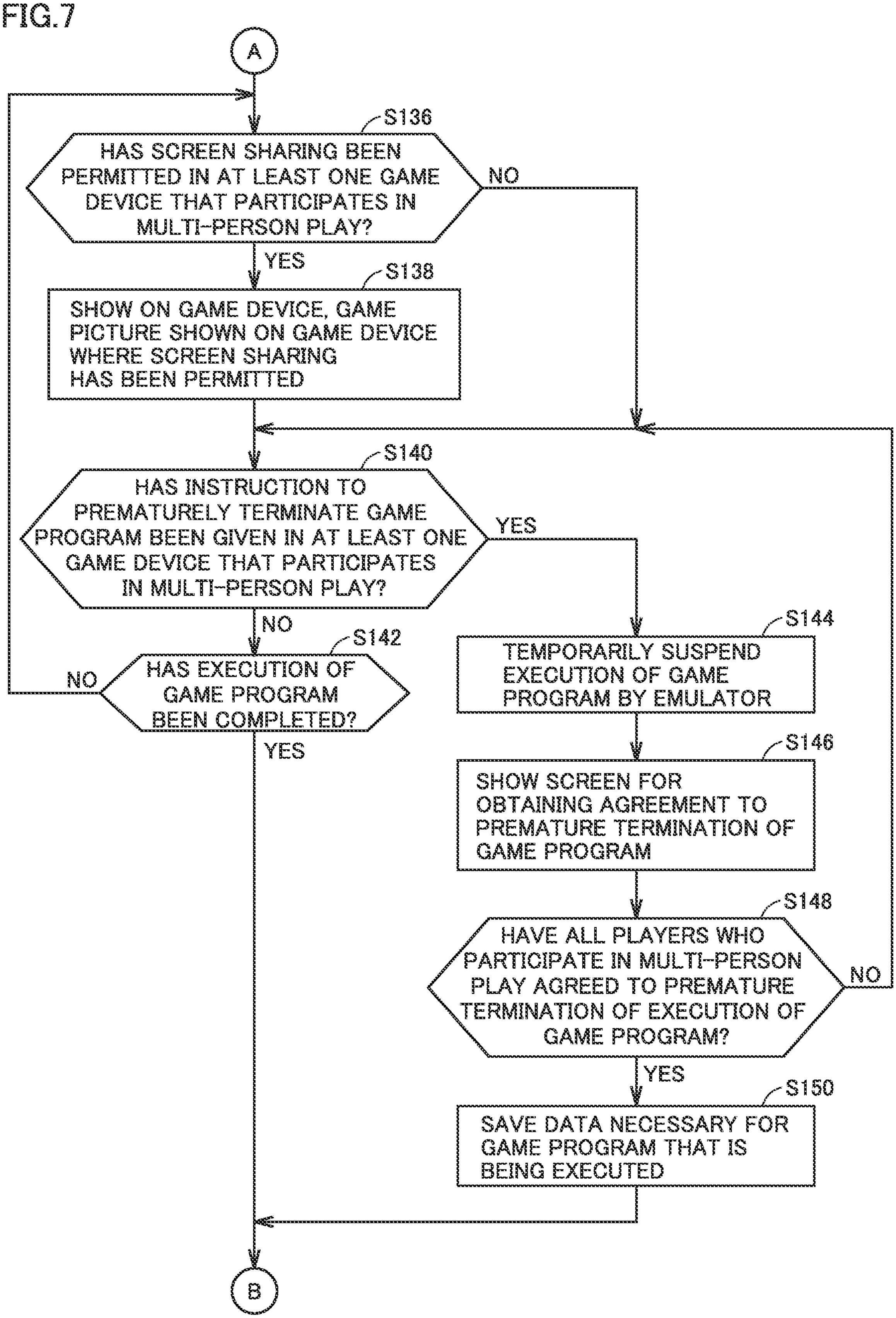

FIGS. 6 and 7 are flowcharts showing an exemplary processing procedure in execution of game program 118 by game device 100 included in the system according to the present embodiment. Each step shown in FIG. 6 may be implemented, for example, at least by execution of execution management program 114 (FIG. 3) by processor 102 of game device 100.

Referring to FIG. 6, game device 100 determines in which mode it is instructed to operate by a player (step S100).

Figure 8:
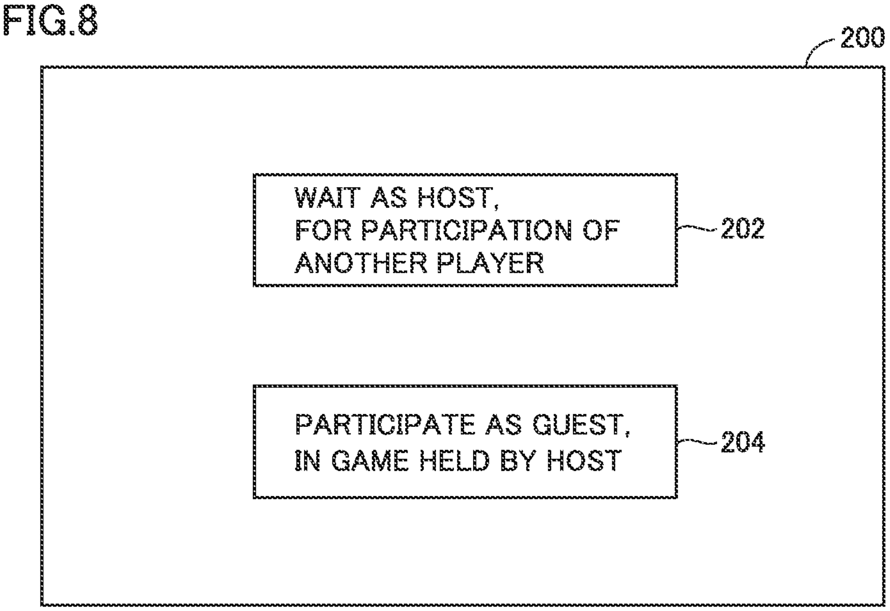
FIG. 8 shows an exemplary illustrative non-limiting drawing illustrating a user interface screen for acceptance of mode selection, by the game device according to the present embodiment.

FIG. 8 is a schematic diagram showing an exemplary user interface screen 200 for acceptance of mode selection, by game device 100 according to the present embodiment. Referring to FIG. 8, user interface screen 200 includes a button 202 for giving an instruction to wait, as the host, for participation of another player and a button 204 for giving an instruction to participate, as a guest, in a game held by the host. A player selects button 202 or button 204.

Referring again to FIG. 6, when the player gives an instruction to operate as the host ("host" in step S100), game device 100 shows on display 106, a screen showing a list of executable game programs 118 (step S102).

Processing in steps S102 to S116 corresponds to a scene in which game program 118 adapted to multi-person play is selected. Only game program 118 adapted to multi-person play may be shown on display 106, or game program 118 not adapted to multi-person play may also be shown. In the latter case, a manner of representation may be different such that a player can distinguish whether or not a game can be played by multiple persons.

Game device 100 generates emulator 126 in the scene where game program 118 adapted to multi-person play is selected (step S104). In other words, the scene where execution of game program 118 with emulator 126 is started may be a scene where selection as to which of a plurality of game programs 118 is to be started is made.

After step S104 is performed, game device 100 operates as the host, and hence it waits for a request for participation from another player. For example, when another game device 100 issues a request for participation of another player (who operates another game device 100) in multi-person play based on communication, game device 100 allows another player to participate in multi-person play so long as timing of request is before start of execution of game program 118, such as timing immediately after step S104.

More specifically, when game device 100 receives the request for participation from another player (YES in step S106), it shares a screen showing a list of executable game programs 118 with another game device 100 that has transmitted the request for participation (step S108). Game device 100 establishes connection 140 that simulates the communication cable between generated emulator 126 and emulator 126 of game device 100 that has transmitted the request for participation (step S110).

Though not clearly shown in FIG. 8, when game device 100 receives a request for leave from another player, it cuts off connection 140 with emulator 126 of game device 100 that has transmitted the request for leave.

Game device 100 with which the screen showing the list of executable game programs 118 is shared becomes game device 100 that participates in multi-person play. The screen showing the list may be shared by transmission of screen data itself from the host to the guest or generation of the screen showing the list in each of game devices 100 that function as the guests upon reception of information on selection of game program 118 from the host.

Figure 9:
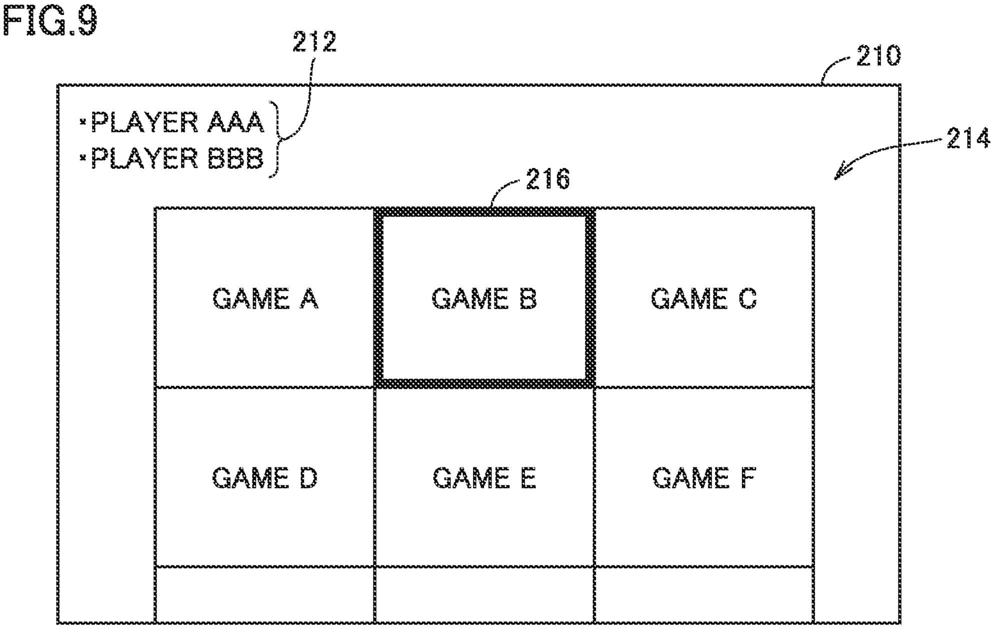
FIG. 9 shows an exemplary illustrative non-limiting drawing illustrating a user interface screen for acceptance of selection of a game program to be executed, by the game device according to the present embodiment.

FIG. 9 is a schematic diagram showing an exemplary user interface screen 210 for acceptance of selection of a game program to be executed by game device 100 according to the present embodiment. Referring to FIG. 9, user interface screen 210 includes participating player representation 212 that shows a currently participating player and representation 214 of a list of game programs 118.

The player as the host can select game program 118 to be executed, by performing an operation for selection in user interface screen 210. An object 216 indicating selection is shown as being superimposed on selected game program 118.

Referring again to FIG. 6, when there is no request for participation from another player (NO in step S106), processing in steps S108 and S110 is skipped.

Game device 100 is in a state in which it waits for selection of game program 118 by the player who operates game device 100 itself. When the player selects a game program 118 (YES in step S112), game device 100 shows an object for identifying selected game program 118 (step S114). Game device 100 that operates as the host thus selects one of game programs 118 adapted to multi-person play in response to an operation by the player. In other words, game program 118 adapted to multi-person play that is to be executed may be one of a plurality of game programs 118 adapted to multi-person play.

When the player has selected none of game programs 118 (NO in step S112), processing in step S114 is skipped.

In succession, game device 100 determines whether or not it is instructed to start execution of game program 118 (step S116). When the game device is not instructed to start execution of game program 118 (NO in step S116), processing in step S106 and later is repeated.

When game device 100 is instructed to start execution of game program 118 (YES in step S116), it starts execution of selected game program 118 with generated emulator 126 (step S118). In step S118, game device 100 proceeds with multi-person play of game program 118 with emulator 126 based on communication between/among game devices 100 of players who participate in multi-person play.

In step S118, each of game devices 100 executes game program 118 with emulator 126 in accordance with the instruction to start execution and proceeds with multi-person play through communication between/among game devices 100 operated by the players who participate in multi-person play.

On the other hand, when game device 100 is instructed to operate as the guest ("guest" in step S100) by a player, it shows on display 106, a list of another game device 100 that operates as the host and a corresponding player (step S120). Game device 100 then waits for selection of another game device 100 (or a corresponding player) by the player who operates game device 100.

When the player selects another game device 100 (or a corresponding player) (YES in step S122), game device 100 determines whether or not game program 118 is being executed in selected game device 100 (step S124).

When game program 118 is being executed in selected game device 100 (YES in step S124), a message that game program 118 is being executed is shown (step S126). Processing in step S124 and later is then repeated.

Figure 10:
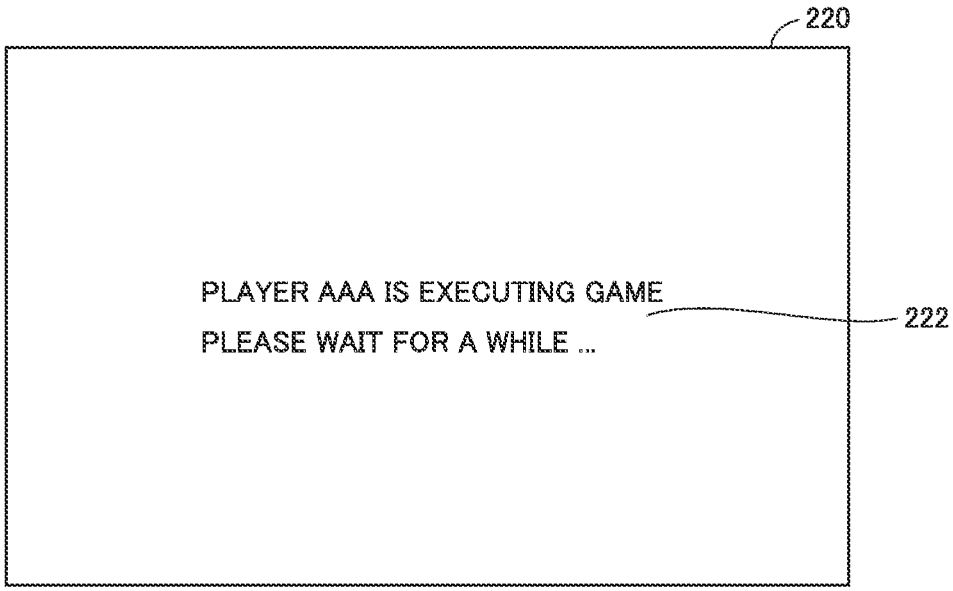
FIG. 10 shows an exemplary illustrative non-limiting drawing illustrating a user interface screen for the game device according to the present embodiment to give a notification that a game program is being executed in a selected host.

FIG. 10 is a schematic diagram showing an exemplary user interface screen 220 for game device 100 according to the present embodiment to give a notification that game program 118 is being executed in the selected host. Referring to FIG. 10, user interface screen 220 includes a message 222 indicating that game program 118 is currently being executed in the selected host.

Game device 100 that operates as the host thus allows, when another game device 100 (that operates as the guest) issues a request for participation of another player in multi-person play based on communication, a state that another player has not participated in multi-person play to continue while game program 118 is being executed. Game device 100 that operates as the guest provides, when it transmits the request for participation in multi-person play to another game device 100 (that operates as the host), representation (user interface screen 220) for having the player wait for play until it is allowed by another game device 100 to participate in multi-person play. With such representation, the player can be prevented from losing a motivation to participate in multi-person play.

Referring again to FIG. 6, when game program 118 is not being executed in selected game device 100 (NO in step S124), game device 100 shares the screen showing the list of executable game programs 118 with selected game device 100 (step S128). Game device 100 generates emulator 126 (step S130) and establishes connection 140 that simulates the communication cable with emulator 126 of game device 100 that has already participated in multi-person play (step S132).

Game device 100 that operates as the host thus allows, when another game device 100 (that operates as the guest) issues a request for participation of another player in multi-person play based on communication and transition to a scene where execution of game program 118 with emulator 126 is started has been made (NO in step S124), another player to participate in multi-person play. In processing in step S124, communication between game device 100 that operates as the host and game device 100 that operates as the guest is maintained.

In succession, game device 100 determines whether or not it is instructed to start execution of game program 118 (step S134). When the game device is not instructed to start execution of game program 118 (NO in step S134), processing in step S134 and later is repeated.

When the game device is instructed to start execution of game program 118 (YES in step S134), processing in step S118 and later is performed.

In succession to step S118, game device 100 determines whether or not screen sharing is instructed in at least one game device 100 that participates in multi-person play (step S136).

When screen sharing is instructed in at least one game device 100 (YES in step S136), game device 100 shows thereon, a game screen shown on game device 100 of a player who has given an instruction for screen sharing (step S138). Details of processing involved with screen sharing will be described later. When screen sharing is not instructed (NO in step S136), processing in step S138 is skipped.

Game device 100 determines whether or not an instruction to prematurely terminate game program 118 has been given in at least one game device 100 that participates in multi-person play (step S140). More specifically, each of game devices 100 determines whether or not it is instructed to terminate game program 118 and whether or not it has received a request to terminate game program 118 from another player through communication.

When game device 100 is not instructed to prematurely terminate game program 118 (NO in step S140), it determines whether or not execution of game program 118 has been completed (step S142). When execution of game program 118 has not been completed (NO in step S142), execution of game program 118 continues and processing in step S136 and later is repeated.

When execution of game program 118 has been completed (YES in step S142), the process returns to step S106.

When the instruction to prematurely terminate game program 118 has been given (YES in step S140), processing as in steps S144 and S146 is performed.

More specifically, game device 100 temporarily suspends execution of game program 18 with emulator 126 (step S144) and shows a screen for obtaining agreement to premature termination of game program 118 (step S146). Game device 100 is thus in a state that it waits for an operation input from each player who participates in multi-person play.

Figure 11:
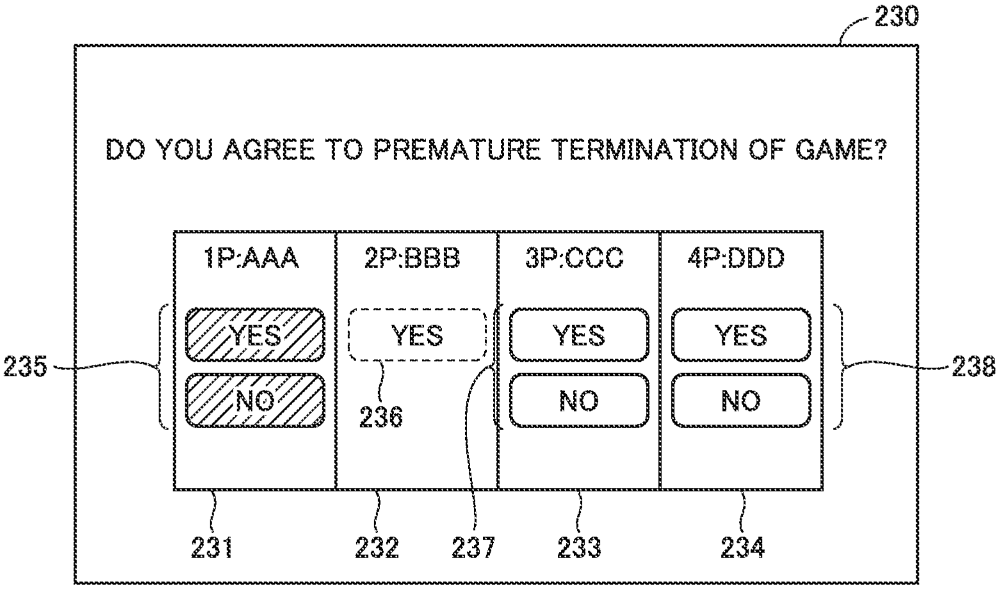
FIG. 11 shows an exemplary illustrative non-limiting drawing illustrating a user interface screen for the game device according to the present embodiment to accept agreement by a player, to premature termination of the game program that is being executed.

FIG. 11 is a schematic diagram showing an exemplary user interface screen 230 for game device 100 according to the present embodiment to accept agreement by a player to premature termination of a game program that is being executed. Referring to FIG. 11, user interface screen 230 includes play-by-player representations 231 to 234 showing states of all players who participate in multi-person play. The number of play-by-player representations is the same as the number of all players who participate in multi-person play.

FIG. 11 shows an example in which a player BBB (2P) has given an instruction for premature termination of game program 118. Therefore, in play-by-player representation 232 of player BBB (2P), a state representation 236 indicating "already agreed" is given. A manner of representation may be such that, after the instruction for premature termination is given, whether or not to agree to premature termination can again be selected.

FIG. 11 shows exemplary representation in game device 100 operated by a player AAA (1P). Therefore, in play-by-player representation 231 of player AAA (1P), a state representation 235 that allows the player to select whether or not to agree is provided.

In play-by-player representations 233 and 234 of other players CCC (3P) and DDD (4P), state representations 237 and 238 showing what is selected by each player are given.

Referring again to FIG. 7, when all players who participate in multi-person play agree to premature termination of execution of game program 118 (YES in step S148), game device 100 has data saved, the data being data necessary for game program 118 that is being executed (step S150). The process then returns to step S106.

Thus, during multi-person play, when game device 100 is instructed to quit the game (by the player thereof) or when game device 100 receives a request to quit the game from another player based on communication, game device 100 thus temporarily suspends the game, and when game devices 100 of all players who participate in multi-person play give instructions to quit the game, game device 100 terminates game program 118.

Game device 100 then makes transition to a scene for selection of game program 118 adapted to multi-person play. In other words, when game devices 100 of all players who participate in multi-person play give the instruction to quit the game and game program 118 is terminated, game device 100 makes transition to the scene where selection as to which of the plurality of game programs 118 is to be started is made.

Since emulator 126 and connection 140 are maintained in each of game devices 100, also after transition to the scene for selection of game program 118 adapted to multi-person play, players who have participated in multi-person play of terminated game program 118 are maintained in a state that they are able to participate in multi-person play. In other words, when game devices 100 of all players who participate in multi-person play give the instruction to quit the game and game program 118 is terminated, game device 100 makes transition to the scene for making selection as to which of the plurality of game program 118 is to be started, with the state that players have participated in multi-person play being maintained.

In contrast, unless all players who participate in multi-person play agree to premature termination of execution of game program 118 (NO in step S148), execution of game program 118 is resumed and continues, and processing in step S140 and later is repeated.

[E. Modification of Processing Procedure in Execution of Game Program]

In the processing procedure shown in FIGS. 6 and 7, before premature termination of execution of game program 118, necessary data is saved (step S150). Depending on specifications of game program 118, the data does not have to be saved in some cases. In such a case, step S150 in FIG. 7 can be skipped.

When data does not have to be saved, execution of game program 118 may prematurely be terminated without agreement by all players. In this case, processing in step S146 in FIG. 7 can be skipped. In other words, when at least one player gives an instruction to prematurely terminate game program 118, execution of game program 118 may prematurely be terminated as it is. In order to allow another player to know a status, each player may be notified of a name of a player who has given the instruction for premature termination and the fact of premature termination of game program 118 in response to the given instruction for premature termination.

[F. Screen Sharing]

Processing involved with screen sharing (step S138 in FIG. 7) will now be described.

FIG. 12 is a schematic diagram showing an exemplary user interface screen 240 provided in a screen sharing mode by game device 100 according to the present embodiment.

Game device 100 may select the screen sharing mode as shown in FIG. 12, in addition to a normal representation mode in which a game screen generated as a result of execution of game program 118 is shown. For example, in response to an operation onto a specific push button, switching between the normal representation mode and the screen sharing mode may alternately be made.

Figure 12A:
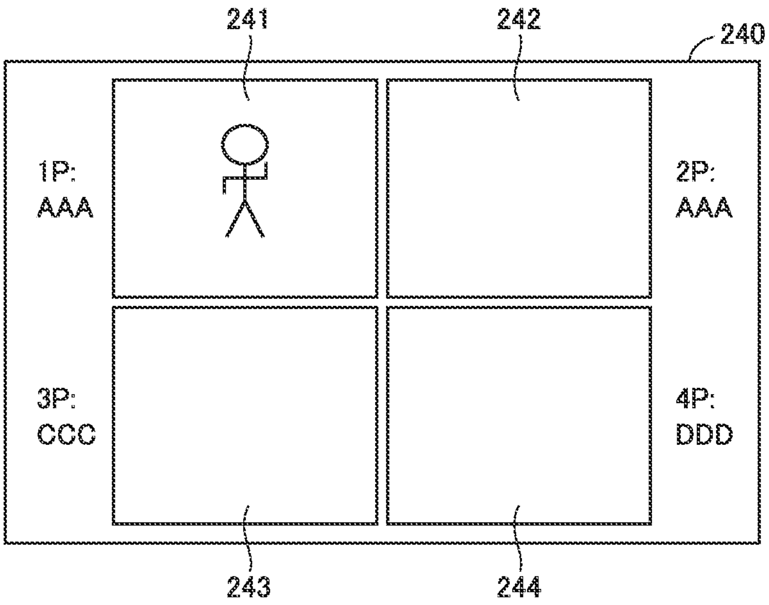
FIGS. 12A and 12B show exemplary illustrative non-limiting drawings each illustrating a user interface screen provided by the game device according to the present embodiment in a screen sharing mode.
Figure 12B:
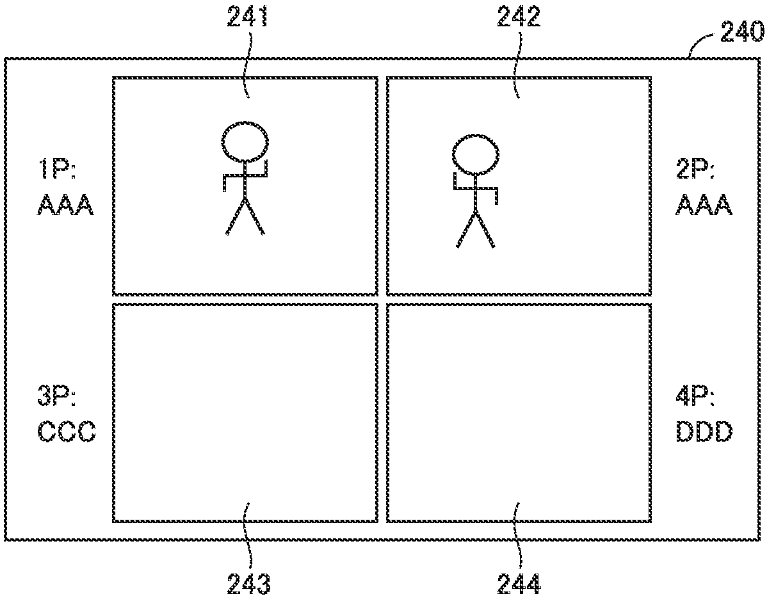

FIG. 12A shows a state in which player AAA (1P) gives an instruction to share the screen and FIG. 12B shows a state in which player BBB (2P) in addition to player AAA (1P) gives an instruction to share the screen.

Referring to FIG. 12A, user interface screen 240 includes representation areas 241 to 244 set for each player (game device 100). In the example shown in FIG. 12A, player AAA (1P) has given the instruction to share the screen, and therefore a game screen generated as a result of execution of game program 118 by game device 100 operated by player AAA (1P) is shown.

In the example shown in FIG. 12B, since player BBB (2P) has given the instruction to share the screen, in addition to the game screen shown in FIG. 12A, a game screen generated as a result of execution of game program 118 by game device 100 operated by player BBB (2P) is shown.

The screen sharing mode may be implemented by transmission of the game screen by each of game devices 100 to another game device 100. More specifically, when each of game devices 100 is instructed to share the screen by the player thereof, it transmits the game screen thereof to another game device 100 while it executes game program 118 with emulator 126. Thus, while game device 100 has the emulator proceed with multi-person play, it receives a game screen of a player who has given the instruction for screen sharing to show the game screen, and when game device 100 gives the instruction for screen sharing, it transmits a game screen to another game device 100.

While each of game devices 100 is executing game program 118 with emulator 126, it receives a game screen of a player who has been given the instruction for screen sharing from another game device 100 to show the game screen thereon.

In game system 1 according to the present embodiment, players can participate in multi-person play even though they are distant from each other unlike the example where the conventional physical communication cable is used. In multi-person play by the players located at remote locations, however, the players are unable to show game screens to each other. In order to address such a problem, by providing the screen sharing mode, even when a plurality of players participate in multi-person play while they are physically distant from each other, they can mutually know statuses of the game.

[G. Advantage]

According to the present embodiment, a scheme to allow multi-person play to normally start and end in implementation of multi-person play through communication by execution with the emulator, of a (past) game program for which multi-person play through communication has not been assumed is provided.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium with an executable information processing program stored thereon, the information processing program causing a computer of an information processing apparatus to perform:

executing a game program adapted to multi-person play with an emulator;

when another information processing apparatus issues a request for participation of another player in the multi-person play based on communication, allowing a state that the another player has not participated in the multi-person play to continue while the game program is being executed, and allowing the another player to participate in the multi-person play when transition to a scene where execution of the game program with the emulator is started is made;

proceeding with the multi-person play of the game program with the emulator based on communication between/among information processing apparatuses of players who participate in the multi-person play; and during the multi-person play, temporarily suspending a game when an instruction to quit the game is given or when a request to quit the game is given from another player based on communication, and terminating the game program when an instruction to quit the game is given from information processing apparatuses of all players who participate in the multi-person play.

2. The non-transitory computer-readable storage medium according to claim 1, wherein the game program adapted to the multi-person play is at least one of a plurality of game programs adapted to multi-person play, and the scene where execution of the game program with the emulator is started is a scene where selection as to which of the plurality of game programs is to be started is made.

3. The non-transitory computer-readable storage medium according to claim 2, wherein when the instruction to quit the game is given from the information processing apparatuses of all players who participate in the multi-person play and the game program is terminated, the computer is caused to perform making transition to the scene where selection as to which of the plurality of game programs is to be started is made.

4. The non-transitory computer-readable storage medium according to claim 3, wherein when the instruction to quit the game is given from the information processing apparatuses of all players who participate in the multi-person play and the game program is terminated, the computer is caused to perform making transition to the scene where selection as to which of the plurality of game programs is to be started is made, with a state that players have participated in the multi-person play being maintained.

5. The non-transitory computer-readable storage medium according to claim 1, wherein the computer is further caused to perform, while the multi-person play is proceeding with the emulator, receiving a game screen of a player who has given an instruction for screen sharing to show the game screen, and transmitting a game screen to another information processing apparatus when the computer receives an instruction for screen sharing.

6. A game system comprising:

a plurality of information processing apparatuses, each of the plurality of information processing apparatuses comprising a processor, wherein the processor of each of the plurality of information processing apparatuses executes a game program adapted to multi-person play with an emulator, when another information processing apparatus issues a request for participation of another player in the multi-person play based on communication, allows a state that the another player has not participated in the multi-person play to continue while the game program is being executed, and allows the another player to participate in the multi-person play when transition to a scene where execution of the game program with the emulator is started is made, proceeds with the multi-person play of the game program with the emulator based on communication between/among information processing apparatuses of players who participate in the multi-person play, and during the multi-person play, temporarily suspends a game when an instruction to quit the game is given or when a request to quit the game is given from another player based on communication, and terminates the game program when an instruction to quit the game is given from information processing apparatuses of all players who participate in the multi-person play.

7. The game system according to claim 6, wherein the game program adapted to the multi-person play is at least one of a plurality of game programs adapted to multi-person play, and the scene where execution of the game program with the emulator is started is a scene where selection as to which of the plurality of game programs is to be started is made.

8. The game system according to claim 7, wherein when the instruction to quit the game is given from the information processing apparatuses of all players who participate in the multi-person play and the game program is terminated, the processor causes transition to the scene where selection as to which of the plurality of game programs is to be started is made.

9. The game system according to claim 8, wherein when the instruction to quit the game is given from the information processing apparatuses of all players who participate in the multi-person play and the game program is terminated, the processor causes transition to the scene where selection as to which of the plurality of game programs is to be started is made, with a state that players have participated in the multi-person play being maintained.

10. The game system according to claim 6, wherein while the multi-person play is proceeding with the emulator, the processor further receives a game screen of a player who has given an instruction for screen sharing to have the game screen shown, and transmits a game screen to another information processing apparatus when the processor receives an instruction for screen sharing.

11. A game device comprising a processor, wherein the processor of the game device executes a game program adapted to multi-person play with an emulator, when another information processing apparatus issues a request for participation of another player in the multi-person play based on communication, allows a state that the another player has not participated in the multi-person play to continue while the game program is being executed, and allows the another player to participate in the multi-person play when transition to a scene where execution of the game program with the emulator is started is made, proceeds with the multi-person play of the game program with the emulator based on communication between/among information processing apparatuses of players who participate in the multi-person play, and during the multi-person play, temporarily suspends a game when an instruction to quit the game is given or when a request to quit the game is given from another player based on communication, and terminates the game program when an instruction to quit the game is given from information processing apparatuses of all players who participate in the multi-person play.

12. The game device according to claim 11, wherein the game program adapted to the multi-person play is at least one of a plurality of game programs adapted to multi-person play, and the scene where execution of the game program with the emulator is started is a scene where selection as to which of the plurality of game programs is to be started is made.

13. The game device according to claim 12, wherein when the instruction to quit the game is given from the information processing apparatuses of all players who participate in the multi-person play and the game program is terminated, the processor causes transition to the scene where selection as to which of the plurality of game programs is to be started is made.

14. The game device according to claim 13, wherein when the instruction to quit the game is given from the information processing apparatuses of all players who participate in the multi-person play and the game program is terminated, the processor causes transition to the scene where selection as to which of the plurality of game programs is to be started is made, with a state that players have participated in the multi-person play being maintained.

15. The game device according to claim 11, wherein while the multi-person play is proceeding with the emulator, the processor receives a game screen of a player who has given an instruction for screen sharing to have the game screen shown, and transmits a game screen to another information processing apparatus when the processor receives an instruction for screen sharing.

16. An information processing method comprising:

executing, by a processor of a game device, a game program adapted to multi-person play with an emulator;

when another information processing apparatus issues a request for participation of another player in the multi-person play based on communication, allowing, by the processor, a state that the another player has not participated in the multi-person play to continue while the game program is being executed, and allowing, by the processor, the another player to participate in the multi-person play when transition to a scene where execution of the game program with the emulator is started is made;

proceeding, by the processor, with the multi-person play of the game program with the emulator based on communication between/among information processing apparatuses of players who participate in the multi-person play; and during the multi-person play, temporarily suspending, by the processor, a game when an instruction to quit the game is given or when a request to quit the game is given from another player based on communication, and terminating, by the processor, the game program when an instruction to quit the game is given from information processing apparatuses of all players who participate in the multi-person play.

17. The information processing method according to claim 16, wherein the game program adapted to the multi-person play is at least one of a plurality of game programs adapted to multi-person play, and the scene where execution of the game program with the emulator is started is a scene where selection as to which of the plurality of game programs is to be started is made.

18. The information processing method according to claim 17, wherein when the instruction to quit the game is given from the information processing apparatuses of all players who participate in the multi-person play and the game program is terminated, the processor causes transition to the scene where selection as to which of the plurality of game programs is to be started is made.

19. The information processing method according to claim 18, wherein when the instruction to quit the game is given from the information processing apparatuses of all players who participate in the multi-person play and the game program is terminated, the processor causes transition to the scene where selection as to which of the plurality of game programs is to be started is made, with a state that players have participated in the multi-person play being maintained.

20. The information processing method according to claim 16, wherein while the multi-person play is proceeding with the emulator, the processor receives a game screen of a player who has given an instruction for screen sharing to have the game screen shown, and transmits a game screen to another information processing apparatus when the processor receives an instruction for screen sharing.

* * * * *